Dec. 16, 1924.
L. R. ROBBINS
1,519,983
PLATE SHEARS
Filed Oct. 25, 1920
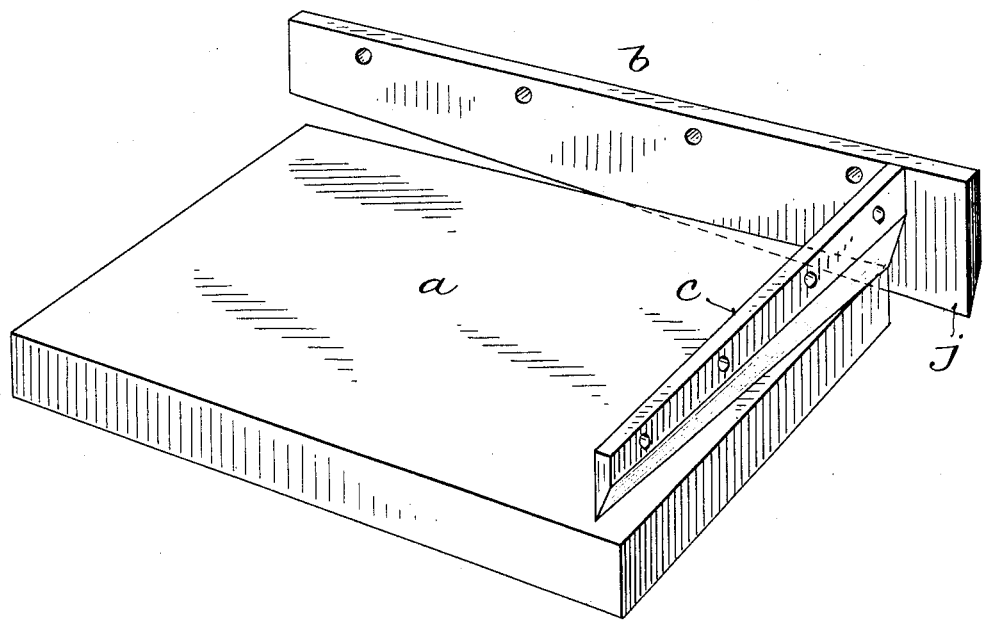
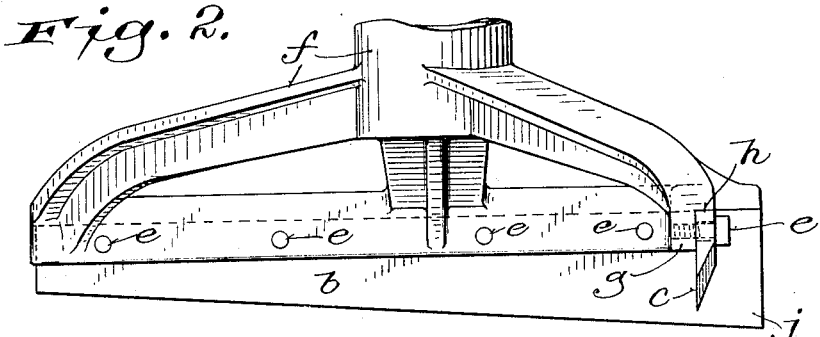
Lorin R. Robbins
INVENTOR
BY
Bottum, Bottum, Hudnall & Lecher
ATTORNEYS.

Patented Dec. 16, 1924.

1,519,983

UNITED STATES PATENT OFFICE.

LORIN R. ROBBINS, OF MILWAUKEE, WISCONSIN.

PLATE SHEARS.

Application filed October 25, 1920. Serial No. 419,182.

*To all whom it may concern:*

Be it known that I, LORIN R. ROBBINS, a citizen of the United States, residing at Milwaukee, in the county of Milwaukee and State of Wisconsin, have invented certain new and useful Improvements in Plate Shears, of which the following is a specification, reference being had to the accompanying drawing, forming a part thereof.

This invention relates to shears for trimming or cutting metal sheets and the like to standard or desired sizes.

Its main objects are to facilitate the trimming or cutting of such sheets; to reduce the number of operations required to trim sheets or plates to the desired sizes; to save time and labor; to increase output; to secure accuracy in shape; and generally to improve the construction and operation of apparatus of this class.

It consists in the construction, arrangement and combination of parts as hereinafter particularly described and pointed out in the claims.

In the accompanying drawing like characters designate the same parts in both figures.

Figure 1 is a perspective view of the two members of shears embodying the invention, the head to which the shear blades are fastened, being omitted; and Fig. 2 is a front elevation of the shears.

The shears comprise two members, a bed $a$, and a cutting member comprising two blades $b$ and $c$, rigidly joined together or connected at an angle to each other.

The bed $a$ on which the sheets to be trimmed or cut are placed and supported, is ordinarily the stationary member of the shears, and is mounted on a suitable base or foundation, as indicated in Fig. 2. Ordinarily it will be of rectangular form, to trim or cut sheets or plates with the sides at right angles to one another, and is provided on two adjacent or adjoining sides with steel or hard metal shearing edges.

The cutting member comprising the blades $b$ and $c$, preferably constitutes the movable member of the shears, and the blades, which may be made integral with each other or separately, are rigidly fastened, as by bolts $e$, shown in Fig. 2, to a reciprocating head $f$, formed with flanges $g$, in which the bolts are threaded, and with shoulders $h$, against which the backs of the blades bear.

The blades are beveled on their outer sides to form cutting edges, which are inclined towards their free ends away from the plane of the bed and work closely against adjacent sides of the bed, cooperating with its edges to produce shearing cuts.

The blades are attached or fastened to each other at an angle exactly corresponding with the angle formed by the adjacent shearing edges of the bed, usually a right angle, so as to produce rectangular sheets or plates.

The cutting edge of one blade, usually the longer blade $b$, is set below or in advance of the cutting edge of the other blade adjacent the junction of the blades, so that one blade will begin and partially make a cut, as shown in Fig. 2, before the other blade begins its cut.

Preferably the blades are made as shown, somewhat longer than the corresponding shearing edges of the bed, and they are so formed and set relative to each other that they will finish their cuts at approximately the same time, the work of the shears in making a complete cut being thus distributed and at the same time expedited, and shock to the machine avoided.

The head $f$ is attached to the plunger of any suitable type of heavy duty shearing press.

The blade $b$, whose cutting edge is set in advance of the cutting edge of the blade $c$, is preferably extended at its wider end $j$, beyond the adjoining wider end of the blade $c$.

In the operation of the shears, a sheet to be trimmed true to standard or desired size, is placed in position on the bed $a$, with two adjoining edges overhanging the shearing edges of the bed, the head $f$ with the blades $b$ and $c$ being raised, as shown in Fig. 2, above the bed. As the head $f$ descends under the control of the operator, the blade $b$ at its wider end adjacent its junction with the blade $c$, begins to trim one side of the sheet, and makes a partial cut before the blade $c$ begins to work, as indicated in Fig. 1. With the continued downward movement or advance of the head $f$, both blades work simultaneously and complete their cuts at or approximately at the same time. In a single operation, two edges of a sheet or plate are evenly trimmed at an exact predetermined angle to each other, the waste trimmed therefrom dropping into a scrap box below the bed.

The head $f$ with the blades, being raised to its upper position, as shown in Fig. 2, the sheet or plate is reversed on the bed $a$, and placed and gaged accurately in position thereon for trimming the remaining two edges with relation to the previously trimmed edges.

By two operations, a sheet or plate is thus trimmed to exact size and shape without special care on the part of the operator, thereby effecting a material saving in time, labor and power, and insuring greater accuracy than is attainable with ordinary methods and means, which necessitate adjusting each sheet or plate three or four times for trimming it to size and shape, and trimming each edge separately.

Various modifications in details of construction and arrangement of parts of the shears may be made without departure from the principle and scope of the invention as defined by the claims.

I claim:

1. In plate shears, the combination of a stationary rectangular bed having adjacent hardened cutting edges, and two blades rigidly attached at right angles to each other and movable together towards and from the bed, the cutting edges of the blades being inclined towards their backs and free ends away from the plane of the bed and adapted to make shearing cuts with adjacent edges of the bed, the cutting edge of one blade being in advance of that of the other adjacent the junction of the blades.

2. In plate shears, the combination of a stationary bed having two adjacent shearing edges at an angle to each other, and a reciprocating head movable towards and from the bed and provided with blades meeting at an angle corresponding with the angle of the shearing edges of the bed and having inclined cutting edges receding from the plane of the bed towards the free ends of the blades and arranged to cooperate with the shearing edges of the bed, the cutting edge of one blade being in advance of that of the other adjacent the junction of the blades.

In witness whereof I hereto affix my signature.

LORIN R. ROBBINS.